C. E. LEASE & C. JACOBSON.
PLOW.
APPLICATION FILED APR. 22, 1913.
1,093,139.
Patented Apr. 14, 1914.
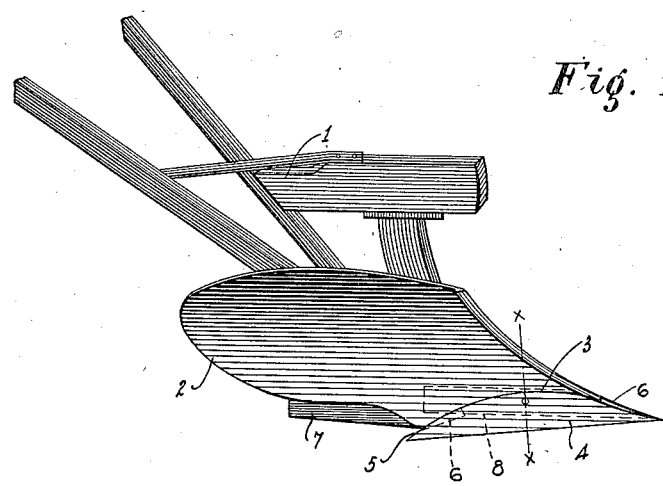
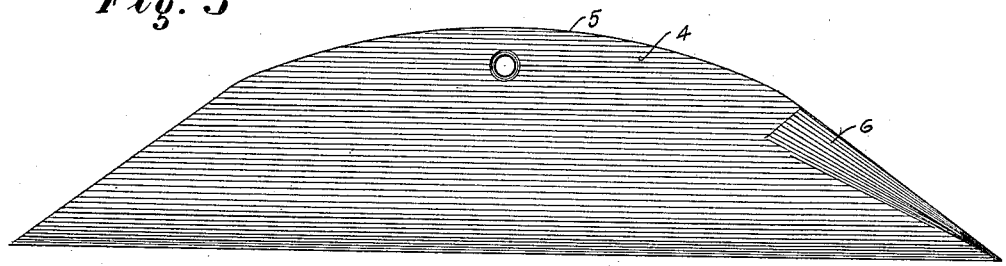
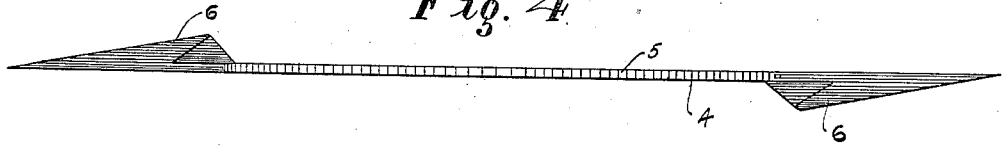
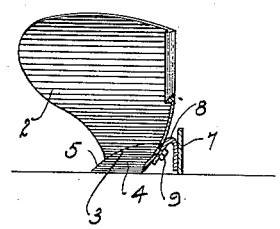
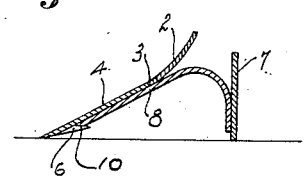
Witnesses
Clarence M. Smith
J. B. Webster
Inventors
C. E. Lease
C. Jacobson
Attorney

UNITED STATES PATENT OFFICE.

CHARLES E. LEASE AND CHARL JACOBSON, OF GALT, CALIFORNIA.

PLOW.

1,093,139.  Specification of Letters Patent.  Patented Apr. 14, 1914.

Application filed April 22, 1913. Serial No. 762,762.

*To all whom it may concern:*

Be it known that we, CHARLES E. LEASE and CHARL JACOBSON, citizens of the United States, both residing at Galt, in the county of Sacramento, State of California, have invented certain new and useful Improvements in Plows; and we do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in plows and particularly to a plow share proper, the object of the invention being to produce a plow share having a double point whereby the same may be reversed when one point gets dull and while one point is in operation, the other point drags or slides along the ground in such a manner as to cause it to become sharpened due to the abrasive nature of the ground over which it slides.

A further object of the invention is to produce a simple and inexpensive device and yet one which will be exceedingly effective for the purposes for which it is designed.

These objects, we accomplish by means of such structure and relative arrangement of the parts as will fully appear by a perusal of the following specification and claim.

On the drawings, similar characters of reference indicate corresponding parts in the several views.

Figure 1 is a perspective view of a portion of a plow frame and plow showing our improved structure in position. Fig. 2 is a sectional view taken on a line X—X of Fig. 1. Fig. 3 is a detached view of our improved plow share. Fig. 4 is a top plan view of the same. Fig. 5 is a fragmentary view showing a fastening means.

Referring now more particularly to the characters of reference on the drawings, the numeral 1 designates the frame of the plow which is of the usual type and the numeral 2 designates the mold board which in our improved structure is provided with a curved cut out portion 3 to receive the plow share which comprises the member 4 having the outer curved surface 5 to fit against the portion 3. Said plow share 4 is provided with two points 5, one at each end, and each point is provided with a projecting mortised flange 6.

The numeral 7 designates the landside secured in the usual manner to the frame of the plow and provided with a plate 8 to which the plow share 4 is secured by a bolt 9. This plate 8 has a beveled portion 10 which receives one of the mortised flanges 6 when the plow share is in position and locks it against the lateral movement and the plate 8 also projects along the plow share 4 clear to the outer point in order to give the same suitable rigidity.

As may be noted, there are two points on the plow share 4 and when one becomes dull, the bolt 9 is removed and the same reversed which gives a new point at the forward end and with the operation of the plow the abrasive action of the earth against the other or rear end sharpens the same so that when the forward end is again dull, it may be reversed and so on indefinitely until the same is worn out. To this end the rear point of course projects below the bottom line of the mold board 2 as shown clearly in Figs. 1 and 2.

From the foregoing description it will readily be seen that we have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described our invention what we claim as new and useful and desire to secure by Letters Patent is:

A device of the character described comprising the combination with a plow having a mold board, of a plow share adapted to engage said mold board, a projecting mortised flange at each end of said plow share, a land side secured to said plow, a plate secured to said land side and projecting flush with said plow share, said plate being shaped at its rear end to receive one of said flanges, and means securing said plow share to said plate, as described.

In testimony whereof we affix our signatures in presence of two witnesses.

CHARLES E. LEASE.
CHARL JACOBSON.

Witnesses:
J. B. WEBSTER,
PERCY S. WEBSTER.